Patented Oct. 11, 1932

1,882,286

UNITED STATES PATENT OFFICE

LEOPOLD LASKA AND OSKAR HALLER, OF OFFENBACH-ON-THE-MAIN, GERMANY, ASSIGNORS TO GENERAL ANILINE WORKS, INC., OF NEW YORK, N. Y., A CORPORATION OF DELAWARE

ARYLAMIDES OF META-HYDROXY-DIARYLAMINE-CARBOXYLIC ACIDS AND PROCESS OF MAKING SAME

No Drawing. Application filed July 3, 1930, Serial No. 465,780, and in Germany July 17, 1929.

The present invention relates to arylamides of meta-hydroxy-diarylamine-carboxylic acids which correspond probably to the general formula:

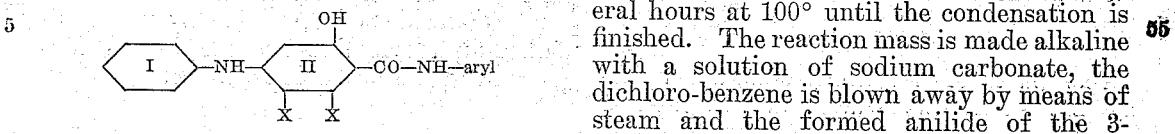

(wherein one X means hydrogen, the other X methyl and the benzene nucleus signified by I may contain further substituents) and to a process of making same.

The process being object of the present invention comprises condensing in the presence of an acid condensing agent a meta-hydroxy-diarylamine-carboxylic acid of the probable general formula:

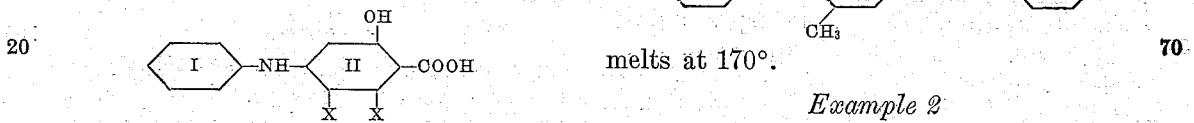

(wherein X and the nucleus I have the aforesaid signification), which acids are described in U. S. application Ser. No. 464,330, filed June 27, 1930, with a primary aromatic amine, whereto a diluent may be admixed.

The new arylamides being object of the present invention are, like the products of U. S. application Serial No. 430,130, filed February 20, 1930, distinguished by a great affinity to the vegetable fiber. The quantity of these arylamides which is fixed on cotton from an alkaline solution of equal concentration, is many times that of the corresponding arylamides of cretontinic acid. From this reason they represent valuable intermediates for the production of dyestuffs.

In order to further illustrate our invention the following examples are given, the parts being by weight and all temperatures in centigrade degrees, but we wish it however to be understood that we are not limited to the particular products nor reaction conditions mentioned therein:—

Example 1

48.6 parts of 3-hydroxy-6-methyl-diphenyl-amine-carboxylic acid are added with 20 parts of aniline to 500 parts of o-dichloro-benzene. At 70–80° 12 parts of phosphorus trichloride are allowed to run in gradually; then the temperature is maintained for several hours at 100° until the condensation is finished. The reaction mass is made alkaline with a solution of sodium carbonate, the dichloro-benzene is blown away by means of steam and the formed anilide of the 3-hydroxy-6-methyl-diphenylamine-4-carboxylic acid is filtered. It may be purified by dissolving it in a caustic soda solution and by precipitating with carbonic acid. When recrystallized from xylene the new anilide of the probable formula:

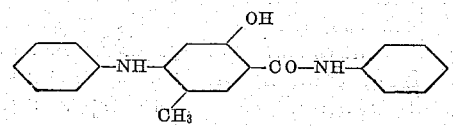

melts at 170°.

Example 2

51.4 parts of 3-hydroxy-6-4'-dimethyl-diphenylamine-4-carboxylic acid are introduced with 20 parts of aniline into 500 parts of o-dichloro-benzene and at a temperature of 70–80° 12 parts of phosphorus trichloride are added to the mixture. The reaction mass is further treated and worked up as described in Example 1. The formed anilide of the 3-hydroxy-6.4'-dimethyl-diphenylamine-4-carboxylic acid may be purified by dissolving it in a caustic soda solution and by precipitating with carbonic acid. When recrystallized from xylene the new anilide of the probable formula:

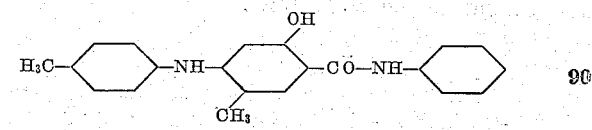

melts at 219°.

Example 3

24.3 parts of 3-hydroxy-6-methyl-diphenylamine-4-carboxylic acid are added with 13.8 parts of p-nitro-aniline to 1000 parts of toluene and at a temperature of 70–80° 6 parts of phosphorus trichloride are allowed to run in slowly. The temperature is maintained for several hours at 110° until the condensation is finished. The reaction mass is rendered alkaline with a solution of sodium carbonate, the toluene is blown away by means of steam and the formed p-nitro-anilide of the 3-hydroxy-6-methyl-diphenylamine-4-carboxylic acid is filtered off. It may be purified by dissolving it in a caustic alkali lye and precipitating with carbonic acid. When recrystallized from o-dichlorobenzene the new p-nitro-anilide of the probable formula:

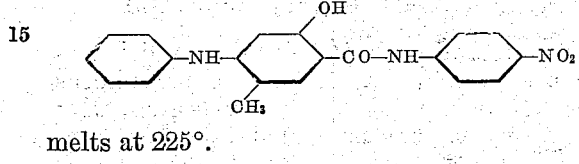

melts at 225°.

Example 4

48.6 parts of 3-hydroxy-6-methyl-diphenylamine-4-carboxylic acid and 21.4 parts of p-toluidine are introduced into 750 parts of dimethyl-aniline and at 70–80° 12 parts of phosphorus trichloride are added gradually to the mixture. The temperature is kept for several hours at 100°. When the condensation is finished the reaction mass is introduced into diluted hydrochlorid acid, the precipitate is filtered off, made alkaline with a solution of sodium carbonate and freed from dimethyl-aniline by means of steam distillation. The formed p-toluidide of the 3-hydroxy-6-methyl-diphenylamine-4-carboxylic acid is filtered off. It may be purified by dissolving it in a caustic alkali lye and by precipitating with carbonic acid. When recrystallized from chloro-benzene it melts at 152°. The new product corresponds probably to the following formula:

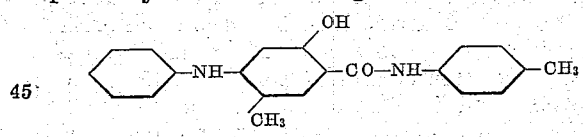

The corresponding p-chloro-anilide melts, when recrystallized from xylene, at 186°; the corresponding p-anisidide melts, when recrystallized from xylene, at 180°; when recrystallized from benzene, the corresponding o-anisidide melts at 152°.

Example 5

To a mixture of 51.4 parts of 3-hydroxy-6.4'-dimethyl-diphenylamine-4-carboxylic acid and 24.6 parts of o-anisidine 1100 parts of toluene are added and at 70–80° 12 parts of phosphorus trichloride are allowed to run in gradually. The reaction mass is further treated and worked up as described in Example 3. When recrystallized from benzene the o-anisidide of the 3-hydroxy-6.4'-dimethyl-diphenylamine-4-carboxylic acid thus obtained, which corresponds probably to the following formula:

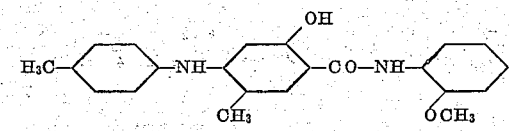

melts at 150–151°.

Example 6

Into a mixture of 51.4 parts of 3-hydroxy-6.4'-dimethyl-diphenylamine-4-carboxylic acid and 25.4 parts of p-chloro-aniline 750 parts of dimethyl-aniline are introduced. At a temperature of 70–80° 12 parts of phosphorus trichlorides are allowed to run in gradually. The reaction mass is further treated and worked up as described in Example 4. When recrystallized from xylene the p-chloro-anilide of the 3-hydroxy-6.4'-dimethyl-diphenylamine-4-carboxylic acid thus obtained of the probable formula:

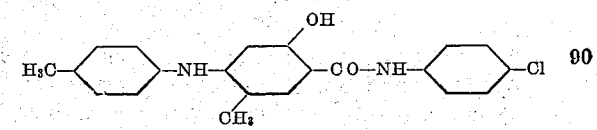

melts at 203–204°.

The corresponding p-nitro-anilide melts when recrystallized from o-dichloro-benzene at 208°. When recrystallized from xylene the corresponding β-naphthylamide melts at 205°.

Example 7

To a mixture of 27.75 parts of 3-hydroxy-6-methyl-4'-chloro-diphenylamine-4-carboxylic acid, 10 parts of aniline and 1100 parts of xylene at a temperature of 70–80° 6 parts of phosphorus trichloride are gradually added to the whole is further treated and worked up as described in Example 3. The anilide of the 3-hydroxy-6-methyl-4'-chloro-diphenylamine-4-carboxylic acid thus obtained melts when recrystallized from chloro-benzene at 183° and corresponds probably to the following formula:

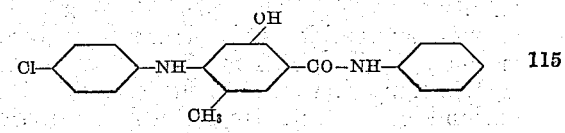

Example 8

27.75 parts of 3-hydroxy-6-methyl-4'-chloro-diphenylamine-4-carboxylic acid and 14.3 parts of β-naphthylamine are introduced into 750 parts of dimethyl-aniline and at a temperature of 70–80° 6 parts of phosphorus trichloride are added gradually to the mixture. The reaction mass is worked up in the same manner as described in Example 4 or 6. When recrystallized from xylene the β-naphthylamide of the 3-hydroxy-6-methyl-4'-chloro-diphenylamine-4- carboxylic acid thus obtained of the probable formula:

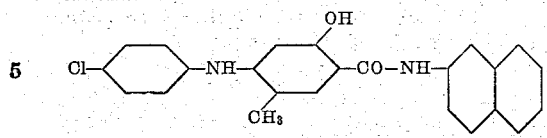

melts at 211°.

*Example 9*

To a mixture of 29.95 parts of the sodium salt of 3-hydroxy-6-methyl-4'-chloro-diphenylamine-4-carboxylic acid and 13.8 parts of p-nitro-aniline 1000 parts of toluene are added and at 70–80° 6 parts of phosphorus trichloride are allowed to run in slowly. The temperature is kept for several hours at 110°. When the condensation is finished the reaction mass is worked up as described in Example 3. The p-nitro-anilide of the 3-hydroxy-6-methyl-4'-chloro-diphenylamine-4-carboxylic acid thus obtained corresponds probably to the formula:

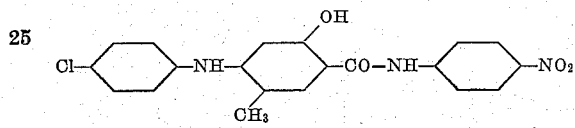

When recrystallized from nitrobenzene it melts at 255°.

When recrystallized from xylene the corresponding: p-chloro-anilide metals at 203°, p-anisidide melts at 178° o-toluidide melts at 185°, o-anisidide melts at 158°. The corresponding m-nitro-anilide melts, when recrystallized from o-dichloro-benzene, at 231°.

*Example 10*

29.95 parts of the sodium salt of 3-hydroxy-5-methyl-4'-chloro-diphenylamine-4-carboxylic acid and 13.8 parts of m-nitro-aniline are added to 1000 parts of xylene and at a temperature of 70–80° 6 parts of phosphorus trichloride are allowed to run in slowly. The temperature is still for several hours maintained at 110°. When the condensation is finished the reaction mass is further treated and worked up as described in Example 3. The m-nitro-anilide of the 3-hydroxyl-5-methyl-4'-chloro-diphenylamine-4-carboxylic acid thus formed of the probable formula:

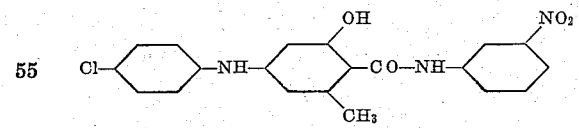

melts when recrystallized from xylene at 145°.

*Example 11*

55.5 parts of 3-hydroxy-5-methyl-4'-chloro-diphenylamine-4-carboxylic acid and 20 parts of aniline are added to 1000 parts of chlorobenzene. At 70–80°, 12 parts of phosphorus trichloride are allowed to run into the mixture and the temperature is then maintained at 110° for several hours until the condensation is finished. The reaction mass is worked up as described in Example 1. The anilide of the 3-hydroxy-5-methyl-4'-chloro-diphenylamine-4-carboxylic acid thus obtained corresponds probably to the following formula:

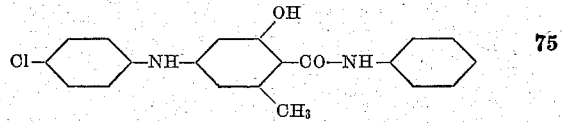

When recrystallized from xylene the corresponding p-chloro-anilide melts at 159° and the corresponding β-naphthylamide at 168°.

We claim:

1. Process which comprises condensing in the presence of phosphorous trichloride a 3-hydroxy-diarylamine-4-carboxylic acid of the probable general formula:

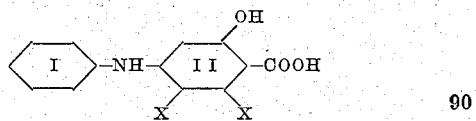

(wherein one X means hydrogen, the other X methyl and the benzene nucleus signified by I may contain alkyl or halogen), with a primary aromatic amine, whereto a diluent may be admixed.

2. Process which comprises condensing in the presence of phosphorous trichloride a 3-hydroxy-diarylamine-4-carboxylic acid of the probable general formula:

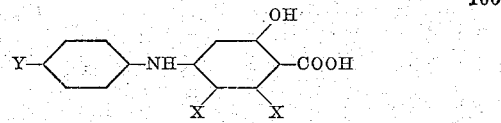

(wherein one X means hydrogen, the other X methyl and Y alkyl or halogen), with a primary aromatic amine, whereto a diluent may be admixed.

3. Process which comprises condensing in the presence of phosphorous trichloride a 3-hydroxy-diarylamine-4-carboxylic acid of the probable general formula:

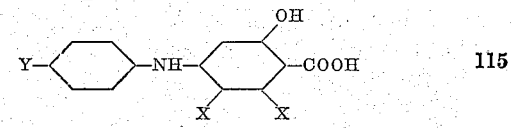

(wherein one X means hydrogen, the other X methyl and Y alkyl or halogen), with 4-nitro-aniline, whereto a diluent may be admixed.

4. As new compounds the arylamides of 3-hydroxy-diarylamine-4-carboxylic acids corresponding to the probable general formula:

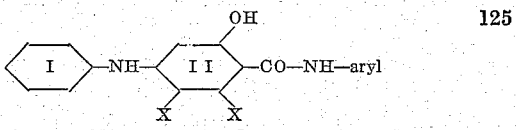

(wherein one X means hydrogen, the other X methyl and the benzene nucleus signified by I may contain alkyl or halogen) which compounds are armorphous or crystallized substances, having a definite melting point, difficultly soluble in organic solvents, easily soluble in alkalies, distinguished by a great affinity to the vegetable fiber.

5. As new compounds the arylamides of 3-hydroxy-diarylamine-4-carboxylic acids corresponding probably to the general formula:

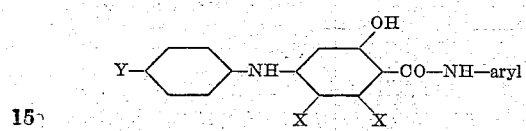

(wherein one X means hydrogen, the other X methyl and Y alkyl or halogen), which compounds are amorphous or crystallized substances, having a definite melting point, difficultly soluble in organic solvents, easily soluble in alkalies, distinguished by a great affinity to the vegetable fiber.

6. As new compounds the arylamides of 3-hydroxy-diarylamine-4-carboxylic acids corresponding probably to the general formula:

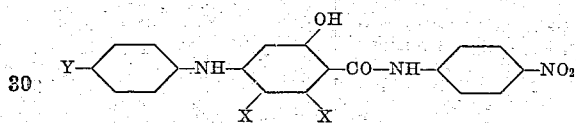

(wherein one X means hydrogen, the other X methyl and Y alkyl or halogen), which compounds are amorphous or crystallized substances, having a definite melting point, difficultly soluble in organic solvents, easily soluble in alkalies, distinguished by a great affinity to the vegetable fiber.

7. As a new compound, the para-chloro-anilide of the 3-hydroxy-6.4'-dimethyl-diphenylamine-4-carboxylic acid corresponding to the probable formula:

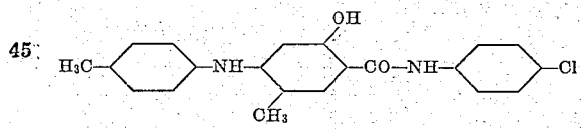

which compound is difficultly soluble in organic solvents, easily soluble in alkalies and melts when recrystallized from xylene at 203–204°.

8. As a new compound, the para-nitro-anilide of the 3-hydroxy-6-methyl-4'-chloro-diphenylamine-4-carboxylic acid corresponding to the probable formula:

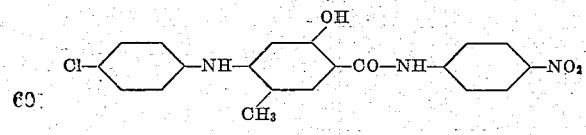

which compound is difficultly soluble in organic solvents, easily soluble in alkalies and melts when recrystallized from nitrobenzene at 255°.

9. As a new compound, the para-chloro-anilide of the 3-hydroxy-5-methyl-4'-chloro-diphenylamine-4-carboxylic acid corresponding to the probable formula:

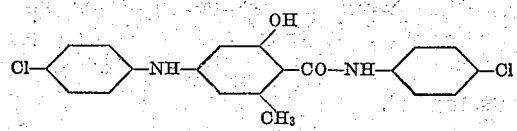

which compound is difficultly soluble in organic solvents, easily soluble in alkalies and melts when recrystallized from xylene at 159°.

In testimony whereof, we affix our signatures.

LEOPOLD LASKA.
OSKAR HALLER.